United States Patent

[11] 3,631,476

| [72] | Inventor | Richard E. Schaffer<br>Scottsdale, Ariz. |
|---|---|---|
| [21] | Appl. No. | 875,009 |
| [22] | Filed | Nov. 10, 1969 |
| [45] | Patented | Dec. 28, 1971 |
| [73] | Assignee | Sperry Rand Corporation |

[54] MULTIPLE ANNUNCIATOR FOR AIRCRAFT INSTRUMENTS
11 Claims, 4 Drawing Figs.

[52] U.S. Cl. ............................................... 340/378,
73/178 R, 73/178 T, 116/129
[51] Int. Cl. ............................................. G08b 5/00
[50] Field of Search ............................................ 73/178 B,
178 T; 340/378 R, 25, 27; 116/129

[56] References Cited
UNITED STATES PATENTS

| 3,338,096 | 8/1967 | Katz | 73/178 |
|---|---|---|---|
| 2,941,306 | 6/1960 | Vecker | 116/129 |
| 3,538,881 | 11/1970 | Fenwick | 73/178 |
| 3,109,167 | 10/1963 | Macintyre et al. | 340/378 |
| 3,260,871 | 7/1966 | Lang | 340/378 |

Primary Examiner—Richard Murray
Assistant Examiner—Richard P. Lange
Attorney—S. C. Yeaton ABSTRACT: A display device for multiple annunciation instruments, particularly of the type used in aircraft, comprising a mask having two diametrically arranged apertures therein. A disk, having a plurality of display indicia disposed on its surface, is mounted for rotation behind the mask so that selected display indicia may be positioned adjacent the apertures to be viewable therethrough. One of the display indicia may include a VOR arrowhead symbol which may be selectively positioned adjacent either of the two apertures.

Patented Dec. 28, 1971 3,631,476

INVENTOR
RICHARD E. SCHAFFER
BY
ATTORNEY

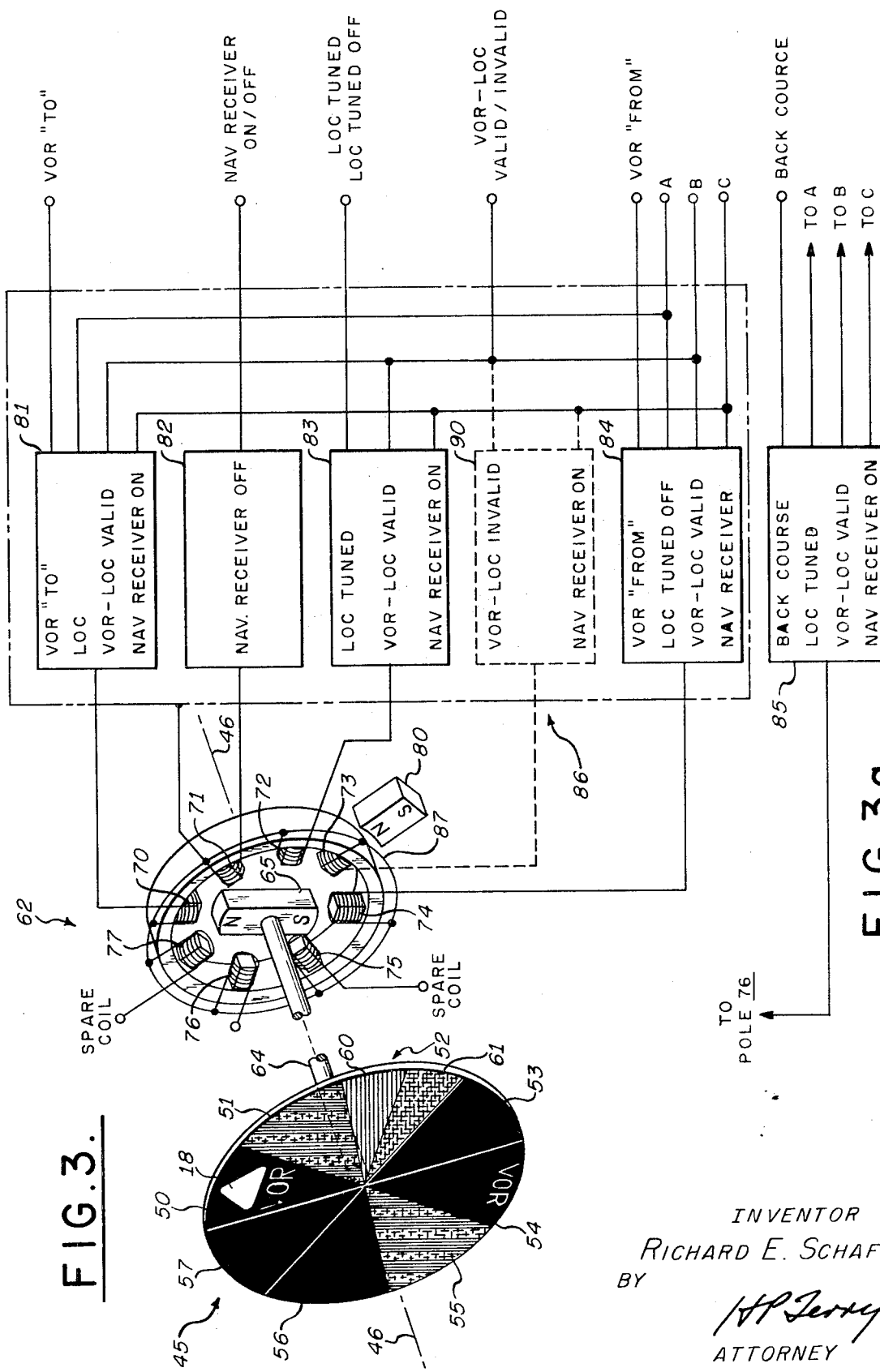

MULTIPLE ANNUNCIATOR FOR AIRCRAFT INSTRUMENTS

BACKGROUND OF THE INVENTION

1. Field of the Invention

The present invention pertains to multiple annunciation instruments particularly of the aircraft flight indicating type.

2. Description of the Prior Art

Prior art multiindicium aircraft flight indicating instruments generally suffer from the disadvantage of requiring separate actuators for the various annunciator functions incorporated thereinto. In addition, separate apertures generally are required in the instrument face for displaying the various annunciator functions. The viewing faces of such instruments usually tend to be cluttered and hence confusing. Additionally, the inclusion of a plurality of actuators tends to increase the cost of manufacturing the instruments as well as to decrease their reliability. Often, because of space limitations, certain annunciator functions must be omitted from an instrument where they might otherwise logically be located. These functions would thus, less conveniently, be located elsewhere.

In particular, aircraft radio direction-indicating instruments often require the display of the VOR "TO/FROM" function. The VOR "TO/FROM" indicium is usually associated with the selected course pointer and comprises a VOR arrowhead positioned at, and pointing toward, the head or tail thereof in accordance, for example, with the aircraft approaching toward or departing from a VOR transmitter, respectively. The VOR arrowhead actuator conventionally comprises a meter movement which selectively swings the arrowhead to either end of the selected course pointer. This arrangement requires excessive space at the instrument face for so swinging the arrowhead symbol. Alternatively, the VOR indicator may comprise two separate arrowheads, selectively exposed to provide the required "TO/FROM" indication. This arrangement is also wasteful of instrument space and in addition requires two separate actuators.

In addition, such a radio direction-indicating instrument often requires a failure annunication indicium for indicating when the radio data are invalid. It may be additionally desirable to include an indicium to indicate when the navigational radio receiver is off. Although usually not incorporated in an aircraft radio direction-indicating instrument, the inclusion therein of a blue left/right indicium (or other suitable indicating means) to indicate whether the aircraft is on the back or front course, respectively, of an instrument landing system, at an airport is desirable. Further, it may be desirable to indicate whether the course deviation data are generated by means other than radio navigation devices, such as an inertial navigation system, or area navigation system.

The separate indicators as set forth above, and their associated actuators tend to increase the manufacturing cost of the instrument in which they are included and to decrease the reliability thereof. The weight and volume of such prior art instruments are also increased by reason of the inclusion of the plurality of separate indicators. Additionally, an excessive number of viewing apertures are required in the instrument face for displaying the plurality of indicia, hence providing a cluttered and confusing display. Such an instrument may be misread during a critical flight maneuver precipitating a dangerous flight condition.

SUMMARY OF THE INVENTION

The present invention is a multiindicium display device for inclusion in instruments such as multiindicium aircraft radio direction-indicating instruments for reducing the number of separate indicator actuators and display apertures heretofore required in like prior devices. The invention includes a display member which may comprise a disk with a plurality of display indicia disposed on its surface. One of the indicia may comprise a VOR arrowhead symbol. The disk is rotatably mounted behind a mask having two apertures therein. The mask may form a portion of the instrument face. The apertures are arranged on the mask diametrically opposed to one another about the axis of rotation of the disk. A positioning device, coupled to the disk, is utilized to rotate the disk thereby selectively positioning the display indicia adjacent the apertures to be viewable therethrough. Specifically, the positioning device selectively positions the VOR arrowhead symbol adjacent either of the two apertures. The apertures may cooperate with the selected course pointer so that the VOR arrowhead symbol may selectively be positioned at, and pointing toward, the head or tail thereof in accordance, for example, with the aircraft approaching toward or departing from a VOR transmitter, respectively.

The display disk may include a plurality of additional indicia for selective display through the two apertures. The indicia may include a failure annunciator, a navigation radio receiver off annunciator, a yellow/blue left/right annunciator, an inertial navigation system mode annunciator, and an area navigation mode annunciator.

By the arrangement of the present invention, a single multiposition actuator, a display disk, and two apertures in the instrument face provide a substantial number of display indicia which heretofore required a substantial number of actuators, display elements and viewing apertures. Hence, the present invention provides a less cluttered instrument face, a less expensive and a more reliable instrument as well as a lighter and more compact device compared to prior art instruments.

The selected course pointer, with which the present invention may cooperate, is usually fixedly mounted in a yoke member which, in turn, is rotatably mounted with respect to the instrument housing. In this arrangement, the mask, disk and positioning device of the present invention may be mounted in the yoke member for rotation therewith.

BRIEF DESCRIPTION OF THE DRAWINGS

FIGS. 3 and 3a are exploded perspective views illustrating the display positioning apparatus of the present invention and block schematic diagrams therefor.

DESCRIPTION OF THE PREFERRED EMBODIMENT

Figure 1:
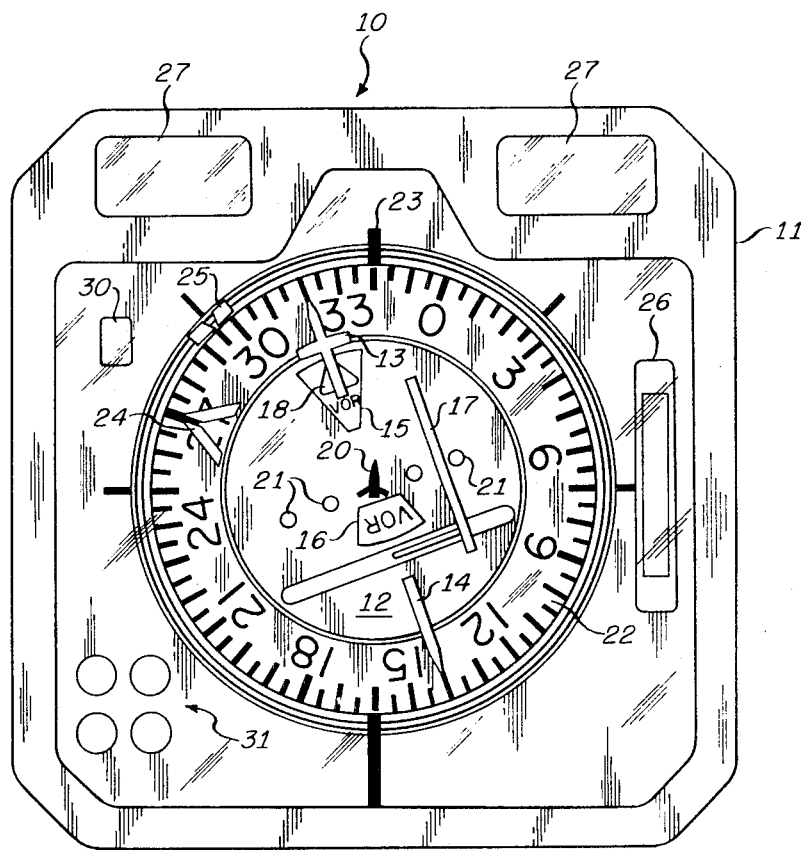
FIG. 1 is a front view of a typical aircraft flight indicating instrument incorporating the present invention.

Referring to FIG. 1, a front view of a typical multiindicium aircraft flight indicating instrument, incorporating the present invention, is illustrated. For purposes of description, the present invention will be explained in terms of inclusion in an aircraft radio direction-indicating instrument of a type conventionally utilized in modern aircraft.

The radio direction-indicating instrument 10 includes a bezel 11 which cooperates with the instrument housing for mounting the instrument to the aircraft in any convenient manner. A mask 12, to which the head 13 and the tail 14 of a selected course pointer may be, but not necessarily, fixedly secured, is mounted for rotation with respect to the bezel 11 in the instrument 10. The mask 12 includes therein display viewing apertures 15 and 16. The apertures 15 and 16 cooperate, in accordance with the present invention, to provide a plurality of display functions, one of which may be the VOR "TO/FROM" arrowhead indicium 18. The arrowhead 18 may selectively be viewed through the aperture 15 or 16 thus being positioned at, and pointing toward, the head 13 or the tail 14, respectively, of the selected course pointer in a manner to be described. The VOR "TO/FROM" indications, respectively, are thus displayed as previously explained. The remaining plurality of display indicia provided in accordance with the present invention are presented through the apertures 15 and 16 in a manner to be explained with respect to FIGS. 2 and 3.

As well as providing a plurality of display indicia through the apertures 15 and 16 in accordance with the present invention, a variety of additional indicators may conventionally be included in the instrument 10. For example, indicator bar 17 may cooperate with the selected course pointer 13 and 14 and a miniature aircraft symbol 20 to display cross-course deviation of the aircraft; the scale dots 21 being utilized in combination with the bar 17 to indicate the magnitude of the deviation. A compass card 22 may be utilized in combination with an index 23 to indicate the actual aircraft heading. The compass card 22 may be conventionally driven by a servo repeater, not shown, from the main compass system of the aircraft. The selected course pointer 13 and 14 may be rotated with the mask 12 by the pilot of the aircraft, or by remote selection, to select a desired course on the compass card 22. Indicators 24 and 25 may conventionally be included in the instrument 10 to indicate automatic direction finder bearing and selected heading, respectively, with respect to the compass card 22. A glide slope indicator 26, as well as digital DME slant range indicators 27 or other digital parameter indicators, may also conventionally be included in the instrument 10. Annunciators 30 and 31 may be included to provide additional display and failure-warning indications.

It will become clear hereinafter how inclusion of the present invention in the multifunction aircraft radio direction-indicating instrument 10 results in the uncluttered and easily read instrument face illustrated in FIG. 1.

Figure 2:
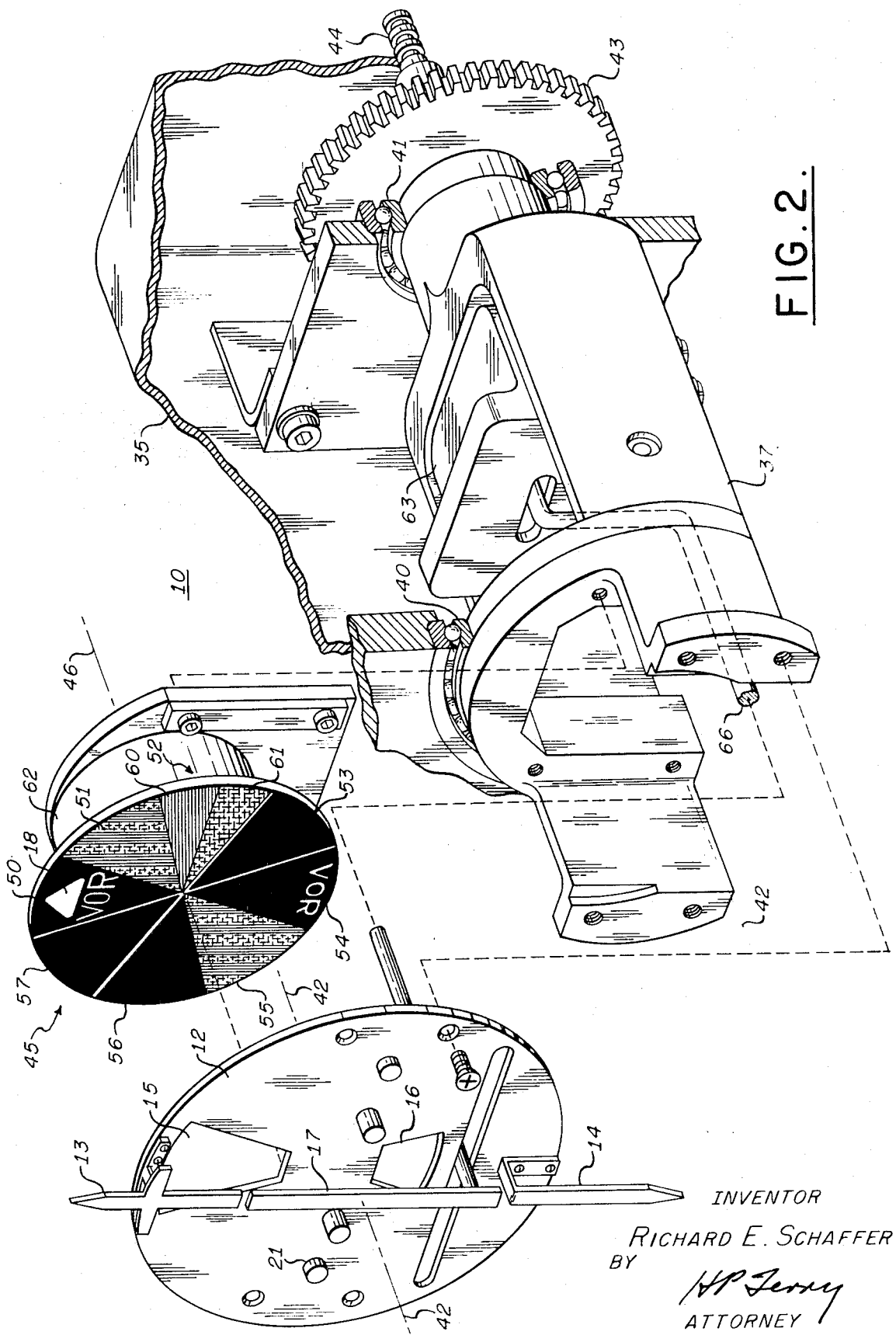
FIG. 2 is an exploded perspective view, partially in section, of the portions of the aircraft flight indicating instrument of FIG. 1 that embody the present invention.

Referring now to FIG. 2, the instrument 10 is enclosed in a housing 35. A yoke member 37 is mounted by means of ball bearings 40 and 41 for rotation with respect to the housing 35. The yoke member 37 may be rotatably positioned about an axis 42 by means of a gear 43 fixedly secured thereto. The gear 43 may be driven by any convenient actuation device not shown. Electrical sliprings 44 may be included with the yoke member 37 to provide electrical connections to components mounted therein for reasons to be discussed.

The mask 12, including the viewing apertures 15 and 16, as previously discussed with respect to FIG. 1, is fixedly secured to the yoke member 37 for rotation therewith. Since the head 13 and the tail 14 of the selected course pointer may be, in turn, fixedly secured to the mask 12, the selected course pointer is positioned to indicate the selected course on the compass card 22, as previously discussed with respect to FIG. 1, by rotation of the yoke member 37.

A display member 45, which may conveniently be formed in the shape of a disk, is mounted behind the mask 12 for rotation with respect thereto about an axis 46. The display disk 45 may have a plurality of display indicia, which may be in the form of sectors, disposed on its surface. For purposes of explanation, the display surface of the disk 45 will be described in terms of eight particular display sectors 50 through 57. The axis 46 is positioned with respect to the mask 12 so that diametrically opposed sectors on the surface of the disk 45 are simultaneously adjacent the apertures 15 and 16, respectively, for viewing therethrough. For example, the disk 45 is so positioned with respect to the mask 12 that sectors 50 and 54 may be simultaneously viewed through the apertures 15 and 16, respectively. The apertures 15 and 16 may be shaped as sectors to coincide with the dimensions of the display sectors 50 through 57 so that only one sector may appear at a time through each of the apertures 15 and 16 when the disk 45 is properly oriented.

The display sectors 50 through 57 may comprise respectively the VOR arrowhead sector, a failure indicium sector, a course indicium sector, a blank sector, a blank VOR sector, a failure indicium sector and two blank sectors. The course indicium sector 52 may include a blue half sector 60 and a yellow half sector 61.

It may be appreciated that display indicia other than those illustrated on the disk 45, such as an inertial navigation system mode annunciator and an area navigation mode annunciator, may be included, for example, by using the blank sectors 53, 56 and 57.

It may further be appreciated that additional display functions may be included on the disk 45 by utilizing a greater number of smaller display sectors as well as correspondingly smaller viewing apertures 15 and 16.

The disk 45 is rotatably driven about the axis 46 by means of a driving or positioning device 62 which may, for example, comprise an electromagnetic positioning motor. The positioning motor 62 is fixedly secured to the yoke member 37. Since the mask 12 as well as the positioning motor 62 are fixedly secured to the yoke member 37, the disk 45 is rotatably positioned about the axis 46 with respect to the mask 12 by the positioning motor 62 in a manner and for reasons to be explained.

As is conventional in instruments of the type illustrated, a meter movement 63 is fixedly secured to the yoke member 37 to position the cross-course deviation bar 17 with respect to the scale dots 21, via a linkage 66, in a manner and for reasons well understood in the art of aircraft flight indicating instruments.

Referring now to FIGS. 3 and 3a, details of the positioning motor 62, as well as a block schematic circuit for selectively energizing the motor 62 are illustrated. The apparatus described in respect to FIG. 3 illustrates a preferred embodiment for flying the normal front landing course of an ILS when making an approach from the front or the back. The apparatus described in respect to FIG. 3a also includes the apparatus illustrated in FIG. 3 and provides the switching logic required when flying the normal approach course of the ILS as well as that required when flying a reciprocal course or a back approach. The display disk 45 is coupled, via a shaft 64, to a permanent magnet 65, the combination being mounted for rotation about the axis 46. Eight electromagnets 70 through 77 are radially disposed about the permanent magnet 65; the selective energization of which electromagnets positions the display sectors 50 through 57 of the disk 45 adjacent the viewing apertures 15 and 16 in a manner to be explained.

A permanent magnet 80 is included adjacent the electromagnet 73 for positioning the display sectors 51 and 55 adjacent the viewing apertures 15 and 16, respectively, when none of the electromagnets 70 through 77 are energized in a manner to be discussed. The permanent magnet 80 is selected to have a magnetic field strength just adequate to position to the permanent magnet 65 adjacent thereto when none of the electromagnets 70 through 77 are energized. The energizing current for the electromagnets 70 through 77 is selected to provide field strengths substantially larger than the field strength of the permanent magnet 80, for reasons to be discussed.

One end of the coils of the electromagnets 70, 71, 72, 74 and 76 are coupled to logic circuits 81 through 85, respectively. The logic circuits 81 through 85 comprise, in combination, a logic circuit 86 of a type well known in the digital electronics art. The other end of the coils of the electromagnets 70, 71, 72, 74 and 76 are connected, via a common buss wire 87, to a common electrical return point of the logic circuit 86.

The logic circuit 86 is responsive to a VOR "TO" signal, a VOR "FROM" signal, a BACK COURSE signal, a NAV RECEIVER ON/OFF signal, a VOR-LOC VALID/INVALID signal and a LOC TUNED/LOC TUNED OFF signal, as indicated by the legends, which signals are provided by the navigation system electronic circuits, not shown, associated with the instrument 10. The circuits 81 through 85 are respectively responsive to selected groups of these signals as indicated by the legends included in the respective blocks. The circuits 81 through 85 may be conventional coincidence circuits that provide respective signals representative of the simultaneous occurrence of the respective groups of input signals applied thereto. For example, the circuit 81 provides an energizing signal to the coil of the electromagnet 70 whenever the VOR "TO," the LOC TUNED OFF, the VOR-LOC VALID, and the NAV RECEIVER ON signals are simultaneously present. Similarly, the circuit 82 energized the electromagnet 71 whenever the NAV RECEIVER OFF signal is present. In a similar manner, the circuit 83 energizes the electromagnet 72 whenever the LOC TUNED, the VOR-LOC VALID and the NAV RECEIVER ON signals are simultaneously present. The circuit 84 energizes the electromagnet 74 whenever the VOR "FROM," the LOC TUNED OFF, the VOR-LOC VALID and the NAV RECEIVER ON signals are simultaneously present; and similarly the circuit 85 of FIG. 3a energizes the electromagnet 76 whenever the BACK COURSE, the LOC TUNED, the VOR-LOC VALID and the NAV RECEIVER ON signals are simultaneously present. The circuits 81 through 85 selectively energize the electromagnets 70, 71, 72, 74 and 76 respectively, for reasons to be discussed.

An additional conventional coincidence circuit 90 may optionally be included in the logic circuit 86 for energizing the electromagnet 73 whenever the VOR-LOC INVALID and the NAV RECEIVER ON signals are simultaneously present for reasons to be explained.

The electromagnets 75 and 77 are included as spare positioning devices for possible use with patterns of display sectors different from those illustrated herein.

In operation, referring to FIGS. 1, 2 and 3 and 3a, the aircraft heading is displayed adjacent the index 23 by the rotatably mounted compass card 22 and the selected course pointer 13 and 14 is adjusted to select a particular bearing with respect thereto.

When the aircraft is flying in a radio mode of navigation, the navigation receiver is on thus providing the NAV RECEIVER ON signal to the logic circuit 86. If, for example, the aircraft is approaching toward a VOR transmitter, the electronic circuits of the radio navigation system of the aircraft may provide the VOR "TO" signal to the logic circuit 86. Since the localizer function of the radio navigation system is not utilized when the aircraft is navigating with respect to a VOR transmitter, the LOC TUNED OFF signal is provided to the logic circuit 86. The VOR signals are validated by circuits not shown, thus providing the VOR-LOC VALID signal to the circuit 86. Under these conditions, the circuit 81 is enabled thus energizing the electromagnet 70. With the electromagnet 70 energized, the north pole of the permanent magnet 65 is attracted thereto, thus positioning the sector 50, which includes the VOR arrowhead symbol 18 adjacent the aperture 15 for viewing therethrough. Thus, the VOR arrowhead 18 appears at, and points toward, the head 13 of the selected course pointer indicating, to the pilot of the aircraft that the aircraft is approaching toward the VOR transmitter in the example cited. If, however, the aircraft is departing from a VOR transmitter, for example, the VOR "FROM" signal may be provided to the logic circuit 86, thus enabling the circuit 84 which in turn energizes the electromagnet 74. With the electromagnet 74 energized, the VOR arrowhead symbol 18 is positioned adjacent the aperture 16 thus positioning the VOR arrowhead 18 at, and pointing toward, the tail 14 of the selected course pointer indicating that the aircraft is departing from the VOR transmitter.

When the aircraft is in the vicinity of an airport, the localizer function provided by the radio navigation system may be utilized, thus providing the LOC TUNED signal, as well as the NAV RECEIVER ON signal, to the circuit 86. The localizer signals are validated by circuits not shown, thus providing the VOR-LOC VALID signal to the circuit 86. When the aircraft is on the front landing course at the airport, the circuit 83 is enabled thus energizing the electromagnet 72. With the electromagnet 72 energized, the blue-yellow sector 52 is positioned adjacent the aperture 16 to be visible therethrough and the blank sector 56 is similarly positioned adjacent the aperture 15. Thus, the blue half sector 60 appears to the right of the yellow half sector 61 indicating to the pilot that the aircraft is on the front landing course at the airport. If, however, the aircraft is approaching the airport on the back ILS course, one embodiment preferred by many pilots is that of setting the instrument to the normal front course bearing. This causes mask 12 and pointers 13 and 14 to be rotated 180° and pointer 13 will point in a downward direction. Similarly, unit 62 will necessarily also rotate 180°.

The circuit 83 is enabled which energizes electromagnet 72. With the electromagnet 72 energized, the blue-yellow sector 52 is positioned to be visible through the aperture 16 and the blank sector 56 is similarly positioned in the aperture 15. Thus, the blue-yellow sectors will appear on the now upper aperture 16 of the disk.

The blue half sector 60 will therefore appear to the left of the yellow half sector 61 and provide, in conjunction with bar 17, a color-coded indication of the right/left position of the runway. When flying the front course of an ILS on a back approach landing, the preferred embodiment provides two indications of the direction of approach, that is, the pointer 13 points downwardly and the color-coded right/left indicator appears at the upper, as opposed to the lower aperture. This annunciation provides the pilot with an indication that he is in fact approaching on the ILS back course and in addition signifies that no glide slope beam is available.

FIG. 3a discloses another embodiment of the invention for flying the ILS beam on a back approach landing. It is understood that the apparatus shown in FIG. 3a may be a part of unit 86 and may be connected or disconnected at will or permanently wired and determining which course, front or back, is flown on the back approach. The back course signal is provided for system 86 by suitable manual select means (not shown) enabling circuit 85 which in turn energizes the electromagnet 76. The blue-yellow sector 52 is then positioned in the aperture 15 with the blue half sector 60 to the left of the yellow half sector 61 indicating that the aircraft is on the back landing course for a back approach landing at the airport.

If the VOR signal or the localizer signal is invalidated by the validation circuits of the radio navigation system, the VOR-LOC INVALID signal is provided to the logic circuit 86, in accordance with the mode in which the system is operating, thus disabling the circuits 81, 83, 84 and 85. The circuit 82 is disabled by reason of the navigation receiver being on. With the circuits 81 through 85 disabled, none of the electromagnets of the positioning motor 62 are energized. The permanent magnet 80 is then able to attract the permanent magnet 65 to a position adjacent thereto, thus displaying the failure annunciation sectors 51 and 55 in the apertures 15 and 16, respectively. Alternatively, a return spring, not shown, may be utilized rather than the permanent magnet 80, to position the failure annunciation sectors 51 and 55 adjacent the viewing apertures 15 and 16. Yet another alternative arrangement for failure annunciation is to utilize the optional circuit 90 to energize the electromagnet 73 whenever the VOR-LOC INVALID signal is provided thereto when the navigation receiver is on.

When the navigation receiver is turned off, the radio navigation system provides the NAV RECEIVER OFF signal to the logic circuit 86. The circuit 82 is therefore enabled thus energizing the electromagnet 71 with the electromagnet 71 energized, the blank sectors 57 and 53 are positioned adjacent the apertures 15 and 16 respectively thus indicating the off condition of the navigation radio receiver.

It may be appreciated that other, as well as additional display symbols may be included on the display surface of the disk 45. It may further be appreciated that in the absence of the present invention, the plurality of display indications provided by the disk 45 would require a plurality of separate actuators as well as a plurality of separate viewing apertures on the face of the instrument 10 to provide the various display functions. Thus, a cluttered and confusing instrument face may result. The inclusion of the present invention in the instrument 10 to provide the uncluttered and easily readable instrument face illustrated in FIG. 1.

While the invention has been described in its preferred embodiment, it is to be understood that the words which have been used are words of description rather than limitation and that changes may be made without departing from the true scope and spirit of the invention in its broader aspects.

I claim:

1. In a multiple annunciation instrument having a housing yoke means rotatably supported within said housing,
   mask means fixed to said yoke means and having at least one aperture therein,
   an annunciator display disk having a face with a plurality of display indicia thereon, said disk being rotatably supported on said yoke means about an axis normal to said face with said face adjacent and behind said mask means in such a manner that said indicia are selectively viewable through said aperture, and rotary motive means coupled with said disk for rotating said disk to selectively position said indicia adjacent said aperture for viewing therethrough.

2. In the multiple annunciation instrument of claim 1 in which said mask means includes first and second apertures therein, said first and second apertures being diametrically disposed with respect to each other about said axis.

3. In the multiple annunciation instrument of claim 2 in which one of said indicia comprises an arrowhead symbol, and said motive means includes means for selectively positioning said arrowhead symbol adjacent said first and second apertures for viewing therethrough.

4. In the multiple annunciation instrument of claim 3 in which said indicia further includes respectively a failure annunciation indicium, first and second blank indicia diametrically disposed with respect to each other about said axis and a two-color back-front course annunciation indicium, and said motive means includes means for selectively positioning said two-color indicium for viewing through said first and second aperture for selectively displaying one of said two colors to the right and to the left of the other of said two colors, respectively.

5. In the multiple annunciation instrument of claim 1 in which said motive means comprises permanent magnet means fixedly connected to said disk, a plurality of electromagnetic means radially disposed about said permanent magnet means, and means for selectively energizing each of said plurality of electromagnetic means for selectively positioning said indicia adjacent said aperture for viewing therethrough.

6. In the multiple annunciation instrument of claim 5 in which said motive means further includes means for positioning a predetermined one of said indicia adjacent said aperture for viewing therethrough whenever none of said plurality of electromagnetic means are energized.

7. A navigation display instrument for aircraft for supplying navigation and monitoring data in a plurality of navigation modes comprising a housing having a generally planar window through which a plurality of display elements may be viewed, said display elements including indicators of aircraft attitude and position relative to a flight path, yoke means mounted in said housing for rotation about an axis normal to said viewing window and including a mask fixed thereto and providing a background mask for said window, said mask having indicia cooperative with said indicators and having at least one aperture therein, an annunciator display disk supported on said yoke means adjacent and behind said mask for rotation about its axis of symmetry, said disk including a plurality of indicia selectively viewable through said aperture indicating navigation and monitoring data for interpreting said display elements, and rotary motive means coupled with said disk for selectively rotating said indicia relative to said aperture depending upon navigation mode and monitoring data.

8. The display instrument as set forth in claim 7 wherein said motive means comprises permanent magnet means fixedly connected to said disk, a plurality of electromagnetic means radially disposed about said permanent magnet means and means for selectively energizing each of said plurality of electromagnetic means for selectively positioning said indicia adjacent said aperture for viewing therethrough.

9. In a multiple annunciation instrument:

yoke means rotatably mounted with respect to a housing, mask means fixedly mounted to said yoke means, said mask means having at least one aperture therein, display means having a display surface containing indicia cooperative with said mask means, positioning means for selectively positioning said display means with respect to said mask means for selectively positioning said indicia adjacent said aperture for viewing therethrough, said display means being mounted for rotation with respect to said mask means about an axis transverse to said display surface and said mask means, said mask means including first and second apertures therein, said first and second apertures being diametrically disposed with respect to each other about said axis, said display means comprising a disk member with said axis centrally disposed normal to the plane thereof, and said positioning means including permanent magnet means fixedly connected to said disk member, a plurality of electromagnetic means radially disposed about said permanent magnet means and means for selectively energizing each of said plurality of electromagnetic means for selectively positioning said indicia adjacent said aperture for viewing therethrough.

10. In the multiple annunciation instrument of claim 9 in which said positioning means further includes means for positioning a predetermined one of said indicia adjacent said aperture for viewing therethrough whenever none of said plurality of electromagnetic means are energized.

11. In the multiple annunciation instrument of claim 3 further including pointer means fixedly secured to said mask means for cooperation with said first and second apertures.

* * * * *

UNITED STATES PATENT OFFICE
CERTIFICATE OF CORRECTION

Patent No. 3,631,476　　　　　　　　　　Dated　December 28, 1971

Inventor(s)　Richard E. Schaffer

It is certified that error appears in the above-identified patent and that said Letters Patent are hereby corrected as shown below:

In Fig. 3, of the drawings, The line labeled "NAV RECEIVER ON/OFF" should be connected to the line labeled C. The line marked "LOC TUNED LOC TUNED OFF" should be connected to the line labeled A. The legend "LOC" in block 81 should be LOC TUNED OFF. The Legend "NAV RECEIVER" in the block 84 should be NAV RECEIVER ON.

Signed and sealed this 20th day of February 1973.

(SEAL)
Attest:

EDWARD M. FLETCHER, JR.　　　　　　ROBERT GOTTSCHALK
Attesting Officer　　　　　　　　　　Commissioner of Patents